United States Patent [19]

Shimura

[11] Patent Number: 4,833,376
[45] Date of Patent: May 23, 1989

[54] MOTOR DRIVE CIRCUIT

[75] Inventor: Kiichiro Shimura, Tokyo, Japan

[73] Assignee: Ichikoh Industries Ltd., Tokyo, Japan

[21] Appl. No.: 116,762

[22] Filed: Nov. 4, 1987

[51] Int. Cl.⁴ .............................................. H02P 5/00
[52] U.S. Cl. ..................................... 318/286; 388/815
[58] Field of Search ................................ 318/307–317, 318/281–286, 287–290, 264–266, 446, 568, 466

[56] References Cited

U.S. PATENT DOCUMENTS

| | | | |
|---|---|---|---|
| 4,281,475 | 8/1981 | Spadoni-Censi | 318/266 |
| 4,374,348 | 2/1983 | Shimura et al. | 318/443 |
| 4,404,558 | 9/1983 | Yen | 318/466 |
| 4,491,774 | 1/1985 | Schmitz | 318/282 |
| 4,544,871 | 10/1985 | Suzuki | 318/568 |
| 4,614,902 | 9/1986 | Jessup | 318/286 |
| 4,621,223 | 11/1986 | Murakami et al. | 318/286 |
| 4,678,975 | 7/1987 | Vrabel et al. | 318/286 |

Primary Examiner—William M. Shoop, Jr.
Assistant Examiner—David Martin
Attorney, Agent, or Firm—Foley & Lardner, Schwartz, Jeffery, Schwaab, Mack, Blumenthal & Evans

[57] ABSTRACT

A motor drive circuit fo driving a reversible motor selectively in a forward or reverse direction comprises a main switch for connecting electrically the motor drive circuit to a power supply source, auxiliary switch circuitry for determining a current path along which a current is to be supplied from the power supply source to the reversible motor and duration in which the current is supplied to the motor, current supply control circuitry for detecting the current path determined by the auxiliary switch circuitry and causing the current to flow along the determined electric path, hold circuitry for holding the operating state of the current supply control circuitry, oscillation circuitry operable in response to the operation of the main switch establishing the connection to the power supply source to supply a reset signal to the hold circuitry and cause the current supply control circuitry to perform current detecting operation through the hold circuit, and current interrupting circuitry for breaking the connection to the power supply source in response to detection of interruption of the current flow to the motor, wherein the direction in which the motor is rotated is alternately changed over upon every closing operation of the main switch.

4 Claims, 3 Drawing Sheets 4,833,376

MOTOR DRIVE CIRCUIT

BACKGROUND OF THE INVENTION

1. Field of the Invention

The present invention generally relates to a motor drive circuit for use in combination with a motor driven apparatus such as, for example, an electrically driven tiltable door mirror provided externally on a body of a motor vehicle projecting laterally therefrom, wherein the housing of the tiltable door mirror is rotatably driven to a folded (retracted) position from a set (projecting) position or vice versa through a remote control from the interior of the motor vehicle.

2. Prior Art

As the outside mirror for a motor vehicle, there are known a fender mirror and a door mirror. The fender mirror has a reflecting surface implemented in the form of a convex mirror and is advantageous in that a large field of view can be assured with a relatively small size and hence the lateral projection of the mirror can be minimized. In contrast, in the case of the door mirror, the reflecting surface is implemented in the form of a plane mirror because the mirror is disposed at a position closer to the point of sight of a driver. Consequently, the door mirror is necessarily of a relatively large size. More specifically, referring to FIG. 1 of the accompanying drawings, the door mirror denoted by a reference character D for a motor vehicle is laterally mounted with a length of projection l. Consequently, space required for storing the motor car in a garage or for transportation thereof is correspondingly increased, involving other additional inconveniences. Besides, when the car is parking, the door mirror may be contacted by passers-by or other cars by accident to be damaged thereby.

For evading the disadvantages mentioned above, there have heretofore been adopted foldable structures of the door mirror which allows the mirror to be folded (retracted) so as to lie within the maximum width of the car body, when occasion requires. Further known in this connection are a manually foldable structure and an automatically foldable structure. In the former case, however, inconvenience is encountered in that the driver must get out of the car every time the door mirror is to be folded or extended, a troublesome labor particularly on a rainy day. This problem can be avoided in the case of the automatically operatable door mirror. In the hitherto known structures of such automatically manipulatable door mirrors, an electric motor is installed within a mirror housing as a drive power source, wherein the motor is rotated selectively in a forward or reverse direction to extend or retract the mirror through remote control from the interior of the car.

FIG. 2 of the accompanying drawings shows in a block diagram a motor drive circuit for the electromechanically tiltable door mirror known heretofore.

Referring to the figure, a motor 111 is disposed within a mirror housing and serves as the driving power source for positioning the door mirror in the folded storage state or in the extended (projecting) state. A motor drive circuit 112 in the form of an integrated circuit or IC is connected to the motor 111 and a power supply source Vcc. The motor drive circuit 112 is provided with switches 113 and 114 mounted on an instrumentation panel at respective positions so as to be easily manipulatable by a driver. Resistors 116 and 115 are connected between the power supply source Vcc and the switches 113 and 114 in parallel with the motor drive circuit 112. The other ends of the switches 113 and 114 are connected to the ground potential. The motor drive circuit also has an earth potential terminal.

So long as the switches 113 and 114 are opened, the motor 111 is not driven. When the switch 113 is closed with the switch 114 being opened, the motor 111 is rotated in the forward direction by the motor drive circuit 112, whereby the mirror housing is set to the laterally projecting position (also referred to the set position). On the other hand, when the switch 114 is closed with the switch 113 being opened, the motor 111 is rotated in the backward or reverse direction to cause the mirror housing to be moved to the retracted position (also referred to as the folded position). Further, when the motor 111 is to be stopped in the course of forward or reverse rotation, this can be accomplished by closing both switches 113 and 114 simultaneously.

As will be seen from the foregoing description, the hitherto known motor drive circuit requires two switches 113 and 114 for rotating the motor in forward and backward directions, respectively. In other words, the prior art mirror drive circuit is incapable of rotating the mirror drive motor selectively in the forward or backward direction with a single switch such as a push button switch. Besides, these known motor drive circuit are not of such structures which allow the duration of motor energization to be automatically controlled. Consequently, the driver must select the forward or reverse rotation switch as occasion demands and holds the selected one in the operated state for a predetermined time, a troublesome procedure.

SUMMARY OF THE INVENTION

In view of the state of the prior art outlined above, it is an object of the present invention to provide a motor drive circuit which is capable of driving a motor selectively in a forward or reverse (backward direction) with a single switch while controlling automatically the time duration for which the motor is electrically energized.

In view of the above object, there is provided according to an aspect of the present invention, a motor drive circuit for driving a reversible motor selectively in a forward or reverse direction, which circuit comprises a main switch for connecting electrically the motor drive circuit to a power supply source, an auxiliary switch circuitry for determining a current path along which a current is to be supplied from the power supply source to the reversible motor and a duration in which the current is supplied to the motor, a current supply control circuitry for detecting the current path determined by the auxiliary switch circuitry and causing the current to flow along the determined electric path, a hold circuit for holding the operating state of the current supply control circuitry, an oscillation circuit operatable in response to the operation of the main switch establishing the connection to the power supply source to supply a reset signal to the hold circuit and cause the current supply control circuit to perform current detecting operation through the hold circuit, and a current interrupting circuit for breaking the connection to the power supply source in response to detection of interruption of the current flow to the motor, wherein the direction in which the motor is rotated is alternately changed over upon every closing operation of the main switch.

In the motor drive circuit of the structure according to the present invention, the direction in which the motor is driven or rotated can be alternately changed every time the main switch is closed through cooperation of the auxiliary switches serving for controlling the direction of the current flowing to the motor with the control circuit which causes the current to flow in the direction determined by the auxiliary switches. Accordingly, the driver can manipulate only one main switch for driving or controlling the motor. Further, since the hold circuit for holding the operation commanded by the main switch is incorporated, only the momentary actuation of the main switch is sufficient for driving the motor to the desired position. In other words, it is unnecessary to hold the main switch in the actuated state continuously until the object such as a mirror has attained the selected or designated position.

Thus, with the motor drive circuit according to the present invention, the forward or backward rotation of the motor can be carried out for a predetermined period simply through momentary actuation of the single main switch, whereby the manipulation procedure is much simplified and facilitated. Further, since only one main switch is sufficient for the intended operations of the motor drive circuit, wiring between the former and the latter can be realized inexpensively in a much simplified manner, even when the main switch is installed at a remote location.

BRIEF DESCRIPTION OF THE DRAWINGS

The above and other objects, features and advantages of the present invention will be more apparent upon consideration of the following description of the preferred embodiments taken in conjunction with the accompanying drawings, in which.

DESCRIPTION OF THE PREFERRED EMBODIMENT

Now, the present invention will be described in detail in conjunction with exemplary and preferred embodiments by reference to the drawings on the assumption that the motor drive circuit according to the invention finds its application to an electromechanically tiltable door mirror for a motor vehicle.

Figure 1:
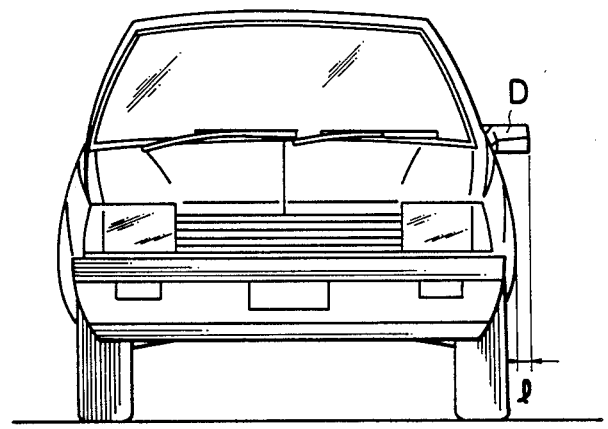
FIG. 1 is a schematic view showing door mirrors mounted on the body of a motor vehicle.
Figure 2:
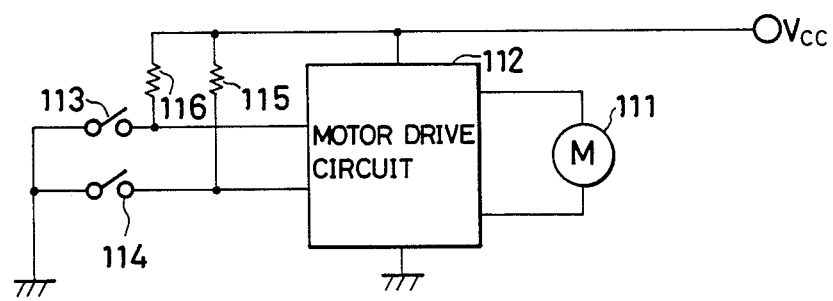
FIG. 2 is a view showing in a block diagram a typical one of hitherto known motor drive circuits used for positioning the door mirror.
Figure 3:
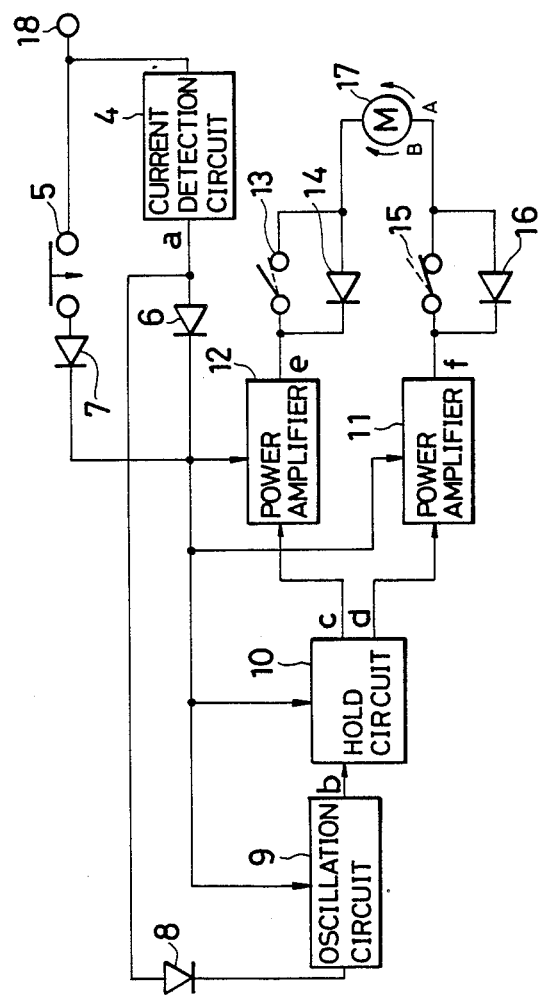
FIG. 3 is a view showing in a block diagram a motor drive circuit according to a first embodiment of the present invention.

FIG. 3 shows the motor drive circuit according to a first embodiment of the invention.

Referring to the figure, a power supply terminal 18 representative of a power supply source is connected to an anode of a diode 7 by way of a main switch 5 for power-up of the motor drive circuit. The diode 7 has a cathode connected to that of a diode 6 of which anode is connected to the power supply terminal 18 through a current detection circuit 4 whose output a in turn is connected to the anode of a diode 8. The latter has a cathode connected to an input terminal of an oscillation circuit 9. The output terminal b of the oscillation circuit 9 is connected to an input end of a hold circuit 10 which has complementary output terminals c and d connected to the inputs of power amplifier circuits 12 and 11 respectively. The power amplifier circuit 12 has an output terminal e which is connected to one of terminals of a motor 17 by way of a parallel connection of a diode 14 and an auxiliary switch 13 which serves for interrupting the motor current. In the similar manner, the output terminal f of the power amplifier circuit 11 is connected to the other terminal of the motor 17 through a parallel connection of a diode 16 and an auxiliary switch 15 which also serves for interrupting the motor current.

In the case of the illustrated motor drive circuit assumed to be applied to an electromechanically tiltable door mirror, the motor 17 is mounted within a mirror housing to function as a driving power source for a mechanism for folding (retracting or withdrawing) and/or setting (extending or projecting) the mirror housing. On the other hand, the main switch 5 is disposed on an instrumentation panel within a motor vehicle at a position to be manually operable by a driver. The switches 13 and 15 are mechanically interlinked with a mechanism for folding/setting the mirror housing and disposed within the mirror housing as with the case of the motor 17, to serve for controlling the current path to the motor 17 as well as the period during which the current is supplied to the motor 17. More specifically, the switch 13 is opened when the mirror housing is at the set state while being closed when the mirror housing is in the folded state. On the other hand, the switch 15 is closed in the set state of the mirror housing and opened in the folded state of the mirror housing.

Next, description will be made on the control and manipulation of the electromechanically tiltable door mirror by means of the motor drive circuit of the structure mentioned above.

In the state illustrated in FIG. 3, the switch 15 is closed with the switch 13 being opened, which means that the mirror housing is in the set (extended) state.

When the main switch 5 is closed starting from the aforementioned state, the individual circuit components mentioned above are supplied with an electric current from the power supply source through the source terminal 18. Consequently, an oscillation signal b is generated by the oscillation circuit 9 in response to which the hold circuit 10 produces the complementary output signals c and d such that high "H" and low "L" levels of the output signals c and d, respectively, are alternated with low "L" and high "H" levels of these signals c and d, respectively. When the output signal c is at "L" level with the output signal d being "H" with the result that the output of the power amplifier circuit 11 is high or "H" with that of the power amplifier circuit 12 being low or "L", the current flows through the motor 17 in the direction indicated by an arrow A, whereby the motor 17 starts to rotate in the forward direction. The oscillation circuit means 9 and the hold circuit means 10 thus serve as control means for detecting the states of the paired auxiliary switches 13 and 15 which command the direction of the current flowing to the motor and supplying the current to the motor 17 in the direction as commanded. When the motor current is detected by the current detection circuit 4, the latter is turned on to change over the current path such that the current can flow through the diode 6 to be supplied to the motor 17. Upon turning-on the current detection circuit 4, the output signal a thereof assumes high level "H", which causes the oscillation of the circuit 9 to be stopped with the result that the complementary outputs c and d of the hold circuit 10 are maintained at the respective levels assumed immediately before the stoppage of the oscillation of the circuit 9. Accordingly, even when the main switch 5 is subsequently opened, the motor 17 continues to rotate in the forward direction, whereby the mirror housing is progressively moved from the set state toward the folded state. Immediately before the mirror housing has attained the completely folded state, the switch 15 is opened by the interlinked mechanism mentioned hereinbefore to stop the current supply to the motor 17. The mirror housing is brought to the finally folded state under the inertia of the motor rotation. Upon stopping of the motor 17, the current detection circuit 4 is turned off, resulting in that the output signal a thereof becomes low "L". In the finally folded state of the mirror housing, the switch 15 is in the opened state with the switch 13 being closed. This state is illustrated by broken lines in FIG. 3.

When the main switch 5 is again closed, the individual circuits are electrically energized through the diodes. In this state, so long as the complementary outputs c and d of the hold circuit 10 are "L" and "H", respectively, no motor current can flow. Consequently, the motor 17 remains in the stationary state. Hence, the current detection circuit 4 is off with the output a thereof being at low level "L". As a result, operation of the oscillation circuit 9 is triggered, whereby a pulse is inputted to the hold circuit 10. This results in that the levels of the complementary outputs c and d of the hold circuit 10 is inverted so that the output c assumes the level "H" with the output d being "L". As a consequence, the output e of the power amplifier circuit 12 becomes "H" while the output f of the power amplifier circuit 11 assumes the level "L". On these conditions, the motor current flows in the reverse direction as indicated by an arrow B, whereby the motor 17 starts rotation in the backward direction.

In response to the backward rotation of the motor 17, the current detection circuit 4 is again turned on with the output signal a thereof assuming the level "H", whereby the current supply path is changed over to that including the diode 6, while the oscillation circuit 9 stops oscillation. The states of the complementary outputs c and d of the hold circuit 10 are held as they are. Accordingly, even when the main switch 5 is opened, the motor 17 continues to rotate in the backward or reverse direction, whereby the mirror housing is progressibly moved toward the set state from the folded state. Immediately before the mirror housing has attained the completely extended state, the switch 13 is again opened to interrupt the current supply to the motor 17. The mirror housing is subsequently brought to the finally set state under the inertia of the motor rotation. Upon stoppage of the motor 17, the current detection circuit 4 is again turned off with the output signal a thereof assuming the level "L". In the finally set state of the mirror housing, the switch 13 is opened while the switch 15 is closed. This state is indicated by solid lines in FIG. 3.

Figure 4:
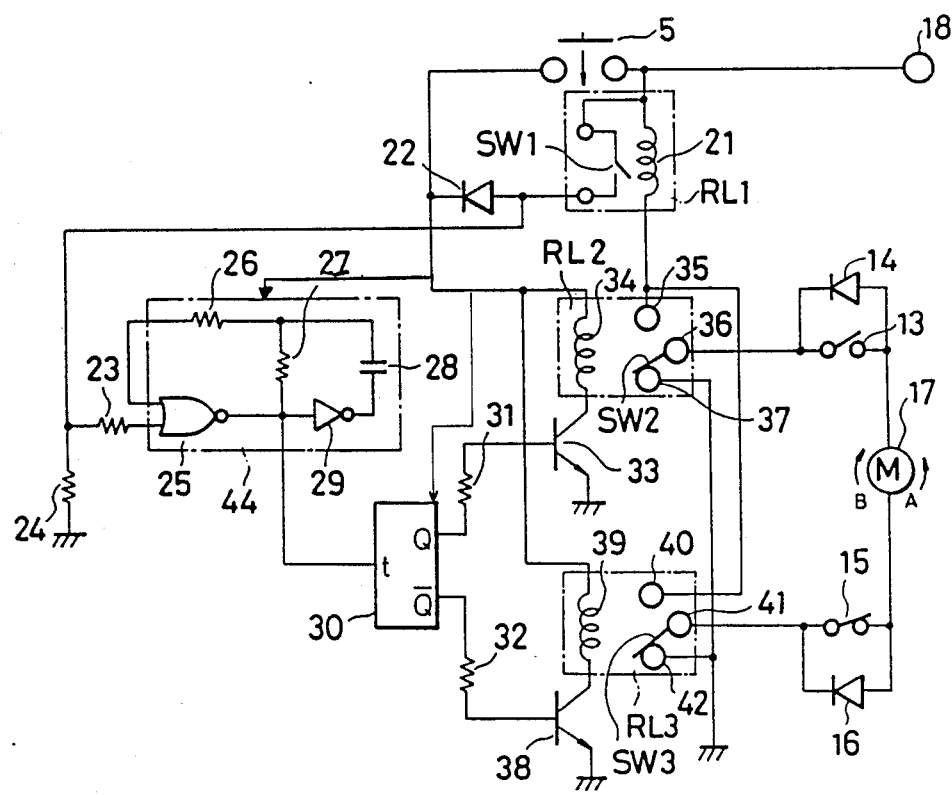
FIG. 4 is a view showing in a block diagram a motor drive circuit according to a second embodiment of the invention.

Referring to FIG. 4 which shows another embodiment of the present invention, a reference symbol RL1 denotes a relay constituting a main part of a current detection circuit corresponding to the one shown in FIG. 3. Relays RL2 and RL3 constitute parts of the power amplifier circuits, respectively. Further, the hold circuit shown in FIG. 4 is constituted by a T—flip-flop circuit 30.

In the motor drive circuit arrangement shown in FIG. 4, the main switch 5, the auxiliary switches 13 and 15 for controlling the current direction in the motor as well as duration of energization, the current source terminal 18, the diodes 14 and 16 and the motor 17 serve for same functions as those of corresponding ones described hereinbefore in conjunction with the first embodiment shown in FIG. 3.

The relay RL1 is constituted by an excitation coil 21 and a switch SW1 closed upon electric energization of the excitation coil 21. The relay RL2 is composed of an excitation coil 34 and a change-over switch SW2 adapted to change over from a contact 36 to a contact 35 in response to energization of the excitation coil 34. The relay RL3 is composed of an excitation coil 39 and a change-over switch SW3 adapted to change over from a contact 42 to a contact 40 upon energization of the excitation coil 39. The relay RL1 is connected to the source terminal 18 which is also connected to the contact 35 of the relay RL2 and the contact 40 of the relay RL3 through the excitation coil 21 of the relay RL1. The relays RL2 and RL3 have respective terminals 37 and 42 both connected to the ground, while the common contacts 36 and 41 of the relays RL2 and RL3 are connected to the terminals of the motor 17 by way of parallel connections of switches 13 and 15 and diodes 14 and 16, respectively. Further, the source terminal 18 is connected through the switch 5 to the cathode of the diode 22 having the anode connected to the switch SW1 of the relay RL1. The source terminal 18 represents the power supply source for supplying electric power to the relay RL1 and other circuitries. The junction between the switch SW1 and the anode of the diode 22 is connected to the earth through a resistor 24 and additionally connected to one input of a NOR circuit 25 through a resistor 23. The NOR circuit 25 cooperates with a NOT circuit 29, resistors 26 and 27 and a capacitor 28 to constitute an oscillation circuit 44, wherein the output terminal of the NOR circuit 25 is connected to the terminal T of the T—flip-flop circuit 30 which constitutes the hold circuit. The complementary outputs Q and $\overline{Q}$ of this T—flip-flop circuit 30 are connected to the bases of relay driving transistors 33 and 38 by way of current limiting resistors 31 and 32, respectively. The relay driving transistors 33 and 38 have respective emitters connected to the ground and the collectors connected to the excitation coils 34 and 39 of the relays RL2 and RL3, respectively. The relay driving transistors 33 and 38 cooperate with the excitation coils 34 and 39 and the switches SW2 and SW3 to constitutes a control circuit which detects the direction of the current flow to the motor 17 designated by means of the auxiliary switches 13 and 15 and causes the current to flow in the detected direction.

Next, operation of the motor drive circuit of the above structure will be described in connection with the operation of the electromechanically tiltable door mirror.

In the circuit state shown in FIG. 4, the switch 15 is closed with the switch 13 being opened, wherein the mirror housing assumes the set (erect or extended) position. Further, the main switch 5 is opened, so that the whole drive circuit is in the deactivated state.

When the main switch 5 is pushed to close the current supply circuit, the motor drive circuit starts operation, whereupon the oscillation circuit 44 begins to oscillate. In response to the output of the oscillation circuit 44, the T—flip-flop circuit 30 is initialized, as the result of which high "H" level makes appearance at the terminal $\bar{Q}$ with low "L" level at the terminal Q. Consequently, the transistor 33 is turned off with the transistor 38 being on, which results in electrical energization of the excitation coil 39 of the relay RL3. In response to the energization of the excitation coil 39, the common contact 41 of the switch SW3 is changed over to the terminal 40 from the terminal 42. At this time, the switch 15 is closed with the switch 13 being opened. Accordingly, the current flows along the current path extending from the excitation coil 21 of the relay RL1 to the ground through the contact 40, switch SW3, contact 41, switch 15, motor 17, diode 14, contact 36, switch SW2 and the contact 37, resulting in that the motor 17 starts the rotation in the forward direction. At the same time, the excitation coil 21 of the relay RL1 is energized to close the switch SW1, whereby the current path is changed over to the one including the diode 22. Further, since the one input of the NOR 25 constituting the oscillation circuit 44 is supplied with high "h" level potential through the resistor 23, the oscillation circuit 44 stops oscillation which results in that no input signal are supplied to the T—flip-flop 30 any more. Accordingly, the state of the flip-flop circuit 30 is held as it is. Thus, the motor 17 continues to rotate in the forward direction until the switch 15 is opened, notwithstanding of the main switch 5 having been released.

In this way, the mirror housing is moved to the folded position from the set position, being driven by the motor 17. Immediately before the mirror housing has attained the completely folded or retracted position, the switch 15 is opened to break the current supply to the motor 17. The finally folded position of the mirror housing can be attained under the inertia of motor rotation. When the switch 15 is opened to interrupt the current flow to the motor 17, the excitation coil 21 of the relay RL1 is also deenergized. Consequently, the switch SW1 is opened, resulting in no current flow in the whole circuit.

When the switch 5 is again closed from the state mentioned above, the power supply source becomes effective to make the oscillation circuit 44 to oscillate. In response to the output signal of the oscillation circuit 44, the T—flip-flop is initialized, whereupon low "L" level makes appearance at the terminal $\bar{Q}$ with high "H" level at the terminal Q. Consequently, the transistor 38 is turned off with the transistor 33 being turned on. As a result, the excitation coil 34 of the relay RL2 is energized, which in turn results in that the common terminal 36 of the switch SW2 is changed over from the terminal 37 to the terminal 35. At that time, the switch 13 is closed with the switch 15 being opened. Accordingly, the current flow path is established from the excitation coil 21 of the relay RL1 to the ground through the contact 35, switch SW2, contact 36, switch 13, motor 17, diode 16, contact 41, switch SW3 and the contact 42, whereupon the motor 17 starts rotation in the reverse or backward direction. At the same time, the excitation coil 21 of the relay RL1 is energized to cause the switch SW1 to be closed, whereby the current path is changed over to the one including the diode 22. Additionally, because of high "H" level applied to one input of the NOR circuit 25 constituting the oscillation circuit 44 through the resistor 23, the oscillation circuit 44 stops oscillation thereof. As a result, no input signal is any more applied to the T—flip-flop circuit 30 which is thus held in the state as it is. This means that the motor 17 continues to rotate in the reverse direction even when the main switch 5 is opened, so long as the switch 13 is closed. In this manner, the mirror housing is moved toward the set or erect state from the folded state, being driven by the motor 17. The switch 13 is opened immediately before the mirror housing has attained the completely erect state, whereupon the current supply to the motor 17 is broken. Subsequently, the mirror housing is brought to the final set or erect position under the inertia of motor rotation. Interruption of the current supply to the motor 17 upon opening of the switch 13 brings about deenergization of the excitation coil 21 of the relay RL1, resulting in that the switch SW1 is opened. The drive circuit has now attained the no-current state.

As will be appreciated from the foregoing description, once the main switch 5 is pushed closed by operator, the motor drive circuit of the structure disclosed herein allows the motor to be automatically rotated for predetermined duration in a predetermined direction designated by the states of the switches 13 and 15 without need for holding the main switch in the closed state continuously (i.e. independently of the state of the main switch 5). When the main switch 5 is again pushed, the motor is caused to rotate for a predetermined period in the reverse direction.

In the foregoing description, it has been assumed that the motor drive circuit according to the illustrative embodiment is applied to the electromechanically tiltable door mirror for a motor vehicle. It should however be appreciated that utilization of the present invention is not restricted to the application to such tiltable door mirror but the invention can find other various applications.

Although the present invention has been described in conjunction with the preferred embodiments of the invention, it should be understood that various modifications of details will readily occur to those shilled in the art without departing from the spirit and scope of the invention.

What is claimed is:

1. A motor drive circuit for driving a reversible motor selectively in a forward or reverse direction, comprising:
   a main switch means electrically connecting said motor drive circuit to a power supply source;
   oscillation circuit means, operable in response to the operation of said main switch means, connected to said power supply source, for outputting oscillation signals;
   hold circuit means, set/reset operable in response to the output signal from the oscillation circuit means, to maintain the operating state of said oscillation circuit means;
   a pair of auxiliary switch means providing a current path along which current is supplied from said power supply source to said reversible motor, said switch means performing ON/OFF operations alternately while said current is supplied to said motor; and
   current detecting means for detecting the current supply to said motor and stopping the operation of the oscillation circuit means, said current detecting means terminating the current supply from the power supply source in response to detection of an interruption of current flow to said motor, wherein,
   said oscillation circuit means and said hold circuit means constituting a current supply control means for detecting the current path determined by the auxiliary switch means, to cause current flow along said determined electric path, the oscillation circuit means outputting one of the set and reset oscillation signals, in response to which the hold circuit means outputs a signal corresponding to said oscillation signal for starting motor rotation, and, if the motor does not start, the oscillation circuit means and the hold circuit means outputting the other signal, respectively, for starting the motor to rotate, whereby, the direction in which said motor is rotated is switched upon every closing operation of the main switch.

2. A motor drive circuit according to claim 1, wherein said current supply control circuit means includes relays having excitation coils and switches closed or opened in dependence on energization of said excitation coils.

3. A motor drive circuit according to claim 1, wherein said hold circuit means is a T—flip-flop circuit.

4. A motor drive circuit according to claim 1, wherein said current detection means includes a further relay having an excitation coil through which a current flows in response to activation of one of said other relays, and said switch is closed or opened in dependence on energization of said excitation coil.

* * * * *